Inventor
JOHN BAXTER GARDNER

By
Aaron R. Townshend  Attorney

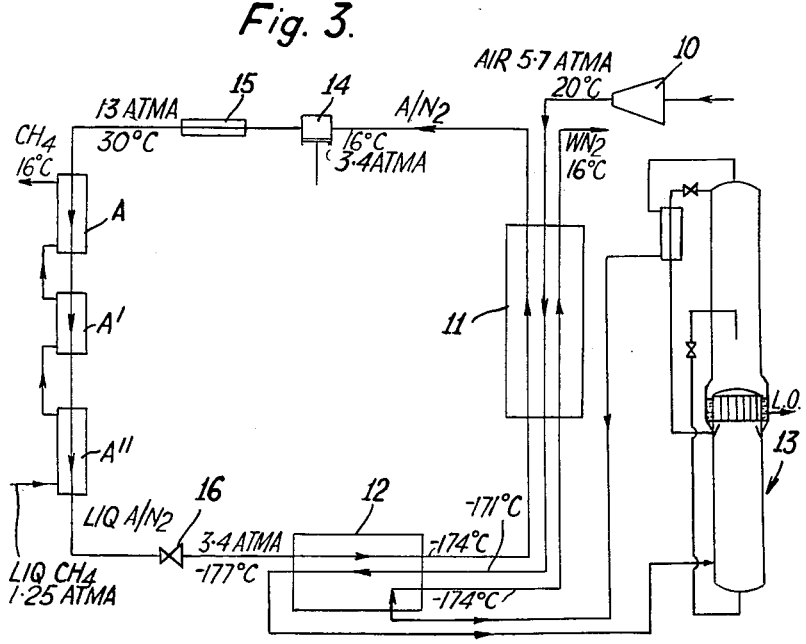
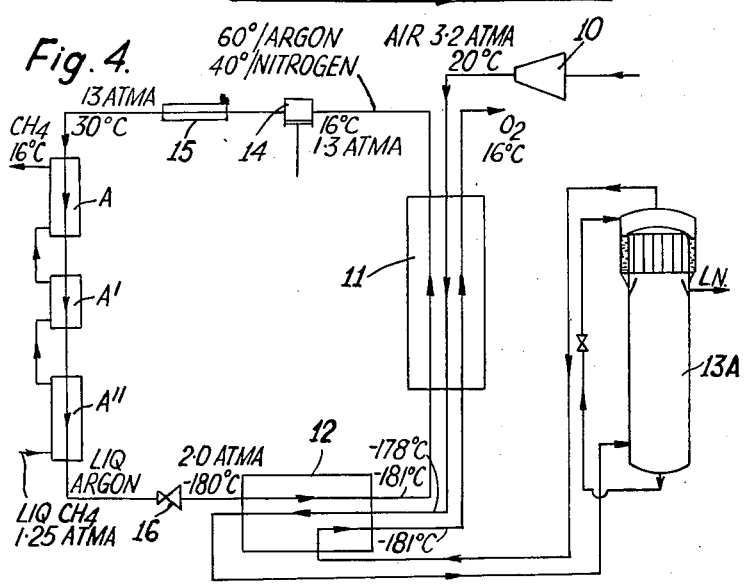

3,058,314
PROCESS AND APPARATUS FOR THE LOW TEMPERATURE SEPARATION OF AIR

John Baxter Gardner, London, England, assignor to The British Oxygen Company Limited, a British company
Filed Aug. 12, 1957, Ser. No. 677,553
2 Claims. (Cl. 62—29)

This invention relates to processes for the production of one or more liquefied atmospheric gases by the low temperature separation of air.

In established methods for the low temperature separation of air in which one or more of the products is recovered as liquid, the necessary refrigeration is usually produced by compressing the air to above atmospheric pressure with subsequent isenthalpic expansion through a valve to produce the so-called "Joule-Thomson" cooling. In addition the air may be cooled by substantially isentropic expansion in a suitable expansion machine such as a reciprocating engine or turbine.

It is also known to provide the necessary refrigeration from an external source by means of an auxiliary refrigerating cycle.

According to one aspect of the present invention, in a process for the production of one or more liquefied atmospheric gases by the low temperature separation of air, at least part of the necessary refrigeration is provided by the evaporation of liquid methane.

In order to avoid hazards which might occur if the liquid methane were used directly as a refrigerant in the air separation process, for example if it were used to condense air in a heat exchanger, a feature of the invention is to employ an inert gas operating in a closed cycle as a heat transfer medium between the evaporating liquid methane and the air being cooled. Examples of suitable gases for this purpose are argon and nitrogen or mixtures thereof. By separating the liquid methane evaporating section from the air separation section with the inert gas or gas mixture circulating between the two sections, the occurrence of slight leakage between the liquid methane and the inert gas cycle or between the air separation section and the inert gas cycle is rendered less hazardous.

According to another aspect of the present invention apparatus for the production of one or more liquefied gases by the low temperature separation of air comprises a supply of liquid methane, means for placing the liquid methane in heat exchange relationship with an inert heat transfer medium operating in a closed cycle, a rectification column, and means for placing the heat transfer medium in heat exchange relationship with air fed to said column.

Methane is normally required for use as a vapour, for example to supplement towns gas, but where it is necessary or advisable to transport the methane in liquid form, the present invention provides a means for combining the vaporisation of liquid methane with recovery of its refrigerating capacity.

By using the available refrigeration of the liquid methane the power consumption for the air separation process is appreciably reduced whilst the need to provide energy solely to vaporise the liquid methane for industrial use is avoided.

In the low temperature separation of air by liquefaction and rectification, the air is first compressed and is then freed from condensible impurities such as carbon dioxide and water vapour and cooled by heat exchange with one or more of the products of rectification. Purification may be effected by normal means, for example, by scrubbing out the $CO_2$ in a suitable tower with caustic soda followed by drying with a suitable absorbent such as activated alumina.

However, if the initial compression of the air is comparatively low, for example, of the order of 6 atmospheres, purification from condensible constituents and cooling may be carried out in a single step by deposition of the impurities in and subsequent resublimation from alternating heat exchangers which may be either regenerators or reversing exchangers, the operation of which need not be described in detail and is well known to those skilled in the art. In order to ensure complete removal of the deposited impurities at each reversal of the exchangers or alternation of the regenerators it is necessary for the relationship between the volumes of the incoming and outgoing gas streams at any point to be such as to counteract the difference in vapour pressure of the condensible constituents corresponding to the temperature and pressure difference between the gas streams at that point i.e. the regenerators or reversing exchangers must be "balanced." One method of balancing is to provide an auxiliary stream of cold gas passing through a separate path in the regenerators or reversing exchangers.

According to a further feature of the present invention in a process for producing one or more liquefied atmospheric gases comprises the step of cooling and purifying the air in alternating heat exchangers, and subsequently partially liquefying the air wherein the whole or part of a stream of the inert gas is used for balancing the exchangers.

The invention will now be more particularly described by way of example with reference to the accompanying drawings in which:

FIGS. 1 to 3 illustrate diagrammatically methods for the production of liquid oxygen in which the rectification unit is a conventional double column using argon, nitrogen and a 60% argon/40% nitrogen mixture respectively as inert recycle gas and;

FIG. 4 illustrates diagrammatically a method for the production of liquid nitrogen in which the rectification unit is a conventional single column, using 60% argon 40% nitrogen as inert recycle gas.

Figure 1:
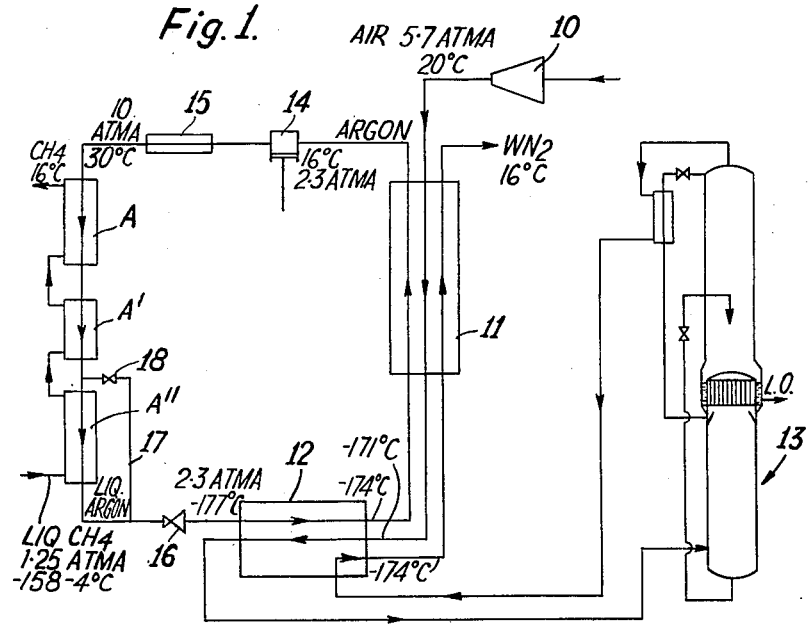

Referring to FIG. 1, air compressed to approximately 5.7 atmospheres in a turbo-compressor 10 or other suitable compressor is cooled and purified in heat exchanger 11, which may be a reversing exchanger or one of a pair of regenerators, countercurrent to waste gaseous nitrogen. The air then passes through a further heat exchanger 12 in which it is partially liquefied by heat exchange with evaporating argon from a closed argon heat transfer cycle, the argon then passing on to heat exchanger 11. The partially liquefied air is led to rectification unit 13 in which it is separated into a liquid oxygen fraction and a gaseous nitrogen fraction, the latter being employed to cool the incoming air as described above. The argon leaving the exchanger 11 at substantially atmospheric temperature is compressed to approximately 10 atmospheres absolute in the compressor 14, cooled in the cooler 15, and passes through a vaporiser consisting of a series of heat exchangers A, A,' A" countercurrent to liquid methane, the methane being evaporated by abstraction of the sensible heat and latent heat of the compressed argon which is liquefied.

For the purpose of this and subsequent examples it is assumed that the vaporized methane is required at substantially atmospheric pressure and ambient temperature. The liquid methane may be forced through the heat exchanger system either by means of a suitable pump or by suitable pressurisation of the liquid methane storage vessel. Should the vaporised methane be required at pressures appreciably above atmospheric, no substantial alteration to the proposed system would be involved, except that the equipment would be required to deliver the liquid methane at the higher pressure.

The argon cooled and liquefied by the evaporating liquid methane is expanded to 2.3 atmospheres absolute through a valve 16 prior to entering the air liquefying exchanger 12 and returns via the exchanger 11 for recompression.

The amount of argon which has to be liquefied in order to provide the necessary refrigeration for the air separation process is less than the amount of argon which is required to balance the exchanger 11. In order to reduce the amount of argon which is liquefied a by-pass 17 having a flow control valve 18 is placed around the section A″ of the liquid methane vaporizer, thus enabling the ratio of the liquid to gaseous argon in the stream entering the air liquefying exchanger 12 to be controlled.

Assuming a scale of production of 1200 cu. m./hour of liquid oxygen, measured at 1 atmosphere absolute and 16° C. the amount of methane evaporated and warmed up to ambient temperature (16° C.) is 1188 cu. m./hour. 2020 cu. m./hour of argon are compressed to 10 atmospheres in order to undergo liquefaction by liquid methane and subsequently expanded to 2.3 atmospheres. In order to provide the necessary refrigeration for air liquefaction only 1599 cu. m./hour of argon need actually be condensed. In fact that part of the argon which remains uncondensed by the liquid methane (461 cu. m./hour) need not be compressed to the full pressure but need only be boosted to say 3 atmospheres in order to overcome pressure drop in the exchangers. Such an arrangement would slightly reduce the power consumption of the process which has been estimated as follows:

```
                              Kwh./100 cu. m. L.O.
For air compression------------------------------  41.3
For argon compression---------------------------   12.4
                                                   ----
    Total ---------------------------------------  53.7
```

This figure represents about half of the normal power consumption in order to produce 100 cu. m. of oxygen as liquid.

Figure 2:
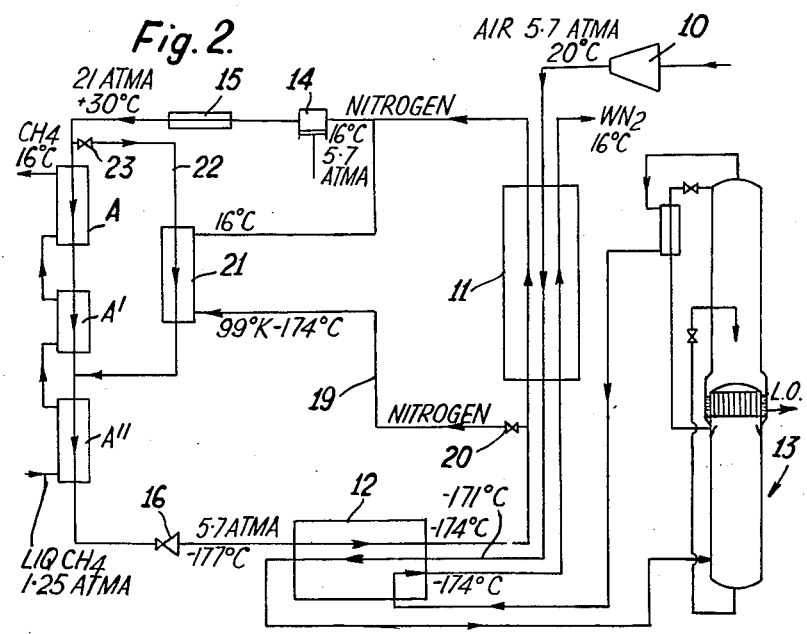

Referring to FIG. 2, the air separation cycle is identical with that shown in FIG. 1, but the nitrogen heat transfer cycle differs in detail from the argon cycle which has been described. Nitrogen is compressed in the compressor 14 to 21 atmospheres absolute, cooled, and passed through the liquid methane vaporiser sections A, A′ and A″ and is then expanded to 5.7 atmospheres absolute through valve 16 before entering the liquefying exchanger 12 from which it returns via the exchanger 11 for recompression. Due to the different physical properties of nitrogen, the amount of gas which must be liquefied to provide the necessary refrigeration is greater than that required for balancing the heat exchanger 11. A by-pass 19 controlled by a valve 20 is therefore provided around the heat exchanger 11, the sensible "cold" in this by-passed nitrogen being recovered in a further heat exchanger 21 by heat exchange with nitrogen flowing through a by-pass 22 controlled by a valve 23 provided around sections A and A′ of the liquid methane vaporiser.

If the same scale of production is assumed as for the process illustrated in FIG. 1, i.e. 1200 cu. m./hour of liquid oxygen, the corresponding quantity of liquid methane evaporated and warmed up to ambient temperature (16° C.) is 1211 cu. m./hour. 2373 cu. m./hour nitrogen are compressed to 21 atmospheres in order to undergo liquefaction by the liquid methane and are subsequently expanded to 5.7 atmospheres. Out of this quantity only 1400 cu. m./hour of nitrogen is required for balancing the regenerators or reversing exchangers, the remainder being used to precool part of the recompressed nitrogen stream in heat exchanger 21. The corresponding power consumption is as follows:

```
                              Kwh./100 cu. m. L.O.
For air compression------------------------------  41.3
For nitrogen compression-------------------------  13.1
                                                   ----
    Total ---------------------------------------  54.4
```

Referring to FIG. 3, in which a mixture of 60% argon/40% nitrogen is used as recycle gas the air separation cycle is identical with that shown in FIGS. 1 and 2 but the closed heat transfer cycle is simplified inasmuch as the heat requirements during the liquid methane evaporation and the operation of the regenerators or heat exchangers are fully balanced. The inert recycle gas mixture is compressed to 13 atmospheres absolute in the compressor 4, and passed through the liquid methane vaporiser sections A, A′ and A″ and is then expanded through valve 16 to 3.4 atmospheres absolute before entering the air liquefying exchanger 12 from which it is returned via the heat exchanger 11 for recompression.

The same scale of production has been assumed as in the two examples illustrated in FIGS. 1 and 2 i.e. 1200 cu. m./hr. of liquid oxygen. The corresponding amount of methane evaporated and warmed up to ambient temperature 16° C. is 1188 cu. m./hr. 1740 cu. m./hr. of the argon/nitrogen mixtures are compressed to 13 atm. a., partly liquefied by liquid methane and subsequently expanded to 3.4 atm. a. The corresponding power consumption is as follows:

```
                              Kwh./100 cu. m. L.O.
For air compression------------------------------  41.3
For re-cycling gas compression-------------------   9.9
                                                   ----
    Total ---------------------------------------  51.2
```

Referring to FIG. 4 in which the rectification unit is a single column for the separation of air into a liquid nitrogen fraction and an oxygen rich gaseous fraction, air compressed to 3.2 atmospheres absolute is passed through heat exchanger 11 countercurrent to the oxygen rich gaseous product, and the air liquefying exchanger 12 to the column 13A. The argon/nitrogen recycle gas is compressed in the compressor 14 to 13 atmospheres absolute, cooled and passed through the liquid methane vaporiser sections A, A′ and A″ in which it is liquefied, and is then expanded through valve 16 to 2 atmospheres absolute before entering the liquefying exchanger 12 from which it is returned via the exchanger 11 for recompression.

As in FIG. 3 illustrating the production of liquid oxygen using argon/nitrogen mixture as the recycle gas, the amount of argon/nitrogen mixture which it is required to liquefy in order to provide the necessary refrigeration for the air separation process equals the amount of mixture required for balancing the alternating heat exchangers.

The assumed scale of production is 140 cu. m./hour of liquid nitrogen. The corresponding volume of methane evaporated and warmed up to ambient temperature (16° C.) is 126 cu. m./hour.

The recycle stream consists of 185 cu. m./hr. 60% argon/40% nitrogen mixture pressurised to 13 atmospheres and liquefied by heat exchange with liquid methane, and subsequently expanded to 2 atmospheres.

The power consumption for this refrigeration cycle is as follows:

For air compression—23.3 kwh. per 100 cu. m. liquid nitrogen.

For compressing the recycling gas—13.1 kwh. per 100 cu. m. liquid nitrogen.

Total—36.4 kwh. per 100 cu. m. liquid nitrogen.

I claim:

1. A process for the production of at least one liquefied atmospheric gas by the liquefaction and subsequent rectification of air with the simultaneous production of gaseous methane, including the steps of evaporating liquid methane in a vaporiser in indirect heat exchange with an at least partially condensed inert gas having a boiling point at atmospheric pressure below −183° C. operating in a closed cycle, whereby said inert gas is cooled, compressing the air and cooling and purifying the compressed air in alternating heat exchangers by heat exchange with a product of rectification, at least a portion of the inert gas being used for balancing the exchangers, the amount of inert gas required for balancing the alternating heat exchangers exceeding the amount of inert gas which must be condensed by evaporation of liquid methane in order to produce the required liquefaction of air, wherein a portion of the inert gas is by-passed around at least a part of the vaporiser, passing said cooled inert gas in indirect heat exchange relationship with cooled air to be liquefied to provide at least a part of the refrigeration necessary to effect such liquefaction, and withdrawing gaseous methane from the air liquefaction and refrigeration system.

2. Apparatus for the production of one or more liquefied atmospheric gases by the liquefaction and subsequent rectification of air with the simultaneous production of gaseous methane comprising means for compressing a stream of air, means for cooling and purifying said stream of compressed air, a liquefier for at least partially liquefying said stream of purified air, a rectification column for receiving the stream of air from the said liquefier, a supply of liquid methane, a vaporiser for effecting heat exchange between said liquid methane and an inert normally gaseous heat transfer medium having a boiling point at atmospheric pressure below −183° C. operating in a closed cycle which includes a means for by-passing a part of the heat transfer medium around the vaporiser, and means for placing the heat transfer medium in heat exchange relationship with air in said liquefier.

References Cited in the file of this patent

UNITED STATES PATENTS

| | | |
|---|---|---|
| 1,292,958 | Morton | Jan. 28, 1919 |
| 1,472,294 | Curme et al. | Oct. 30, 1923 |
| 2,279,097 | Stark | Apr. 7, 1942 |
| 2,458,894 | Collins | Jan. 11, 1949 |
| 2,495,549 | Roberts | Jan. 24, 1950 |
| 2,556,850 | Ogorzaly | June 12, 1951 |
| 2,696,088 | Twomey | Dec. 7, 1954 |
| 2,762,208 | Dennis | Sept. 11, 1956 |
| 2,799,997 | Morrison | July 23, 1957 |
| 2,903,860 | Brown | Sept. 15, 1959 |
| 2,975,604 | McMahon | Mar. 21, 1961 |

FOREIGN PATENTS

| | | |
|---|---|---|
| 736,736 | France | Sept. 26, 1932 |